United States Patent [19]

Klinedinst et al.

[11] Patent Number: 4,495,266
[45] Date of Patent: Jan. 22, 1985

[54] HIGH RATE ELECTROCHEMICAL CELL

[75] Inventors: Keith A. Klinedinst, Marlborough; Carl R. Schlaikjer, Winchester, both of Mass.

[73] Assignee: GTE Laboratories Incorporated, Waltham, Mass.

[21] Appl. No.: 376,057

[22] Filed: May 7, 1982

[51] Int. Cl.³ .............................................. H01M 6/14
[52] U.S. Cl. .................................... 429/105; 429/196; 429/199; 429/220
[58] Field of Search ............... 429/105, 196, 212, 220, 429/199, 194

[56] References Cited

U.S. PATENT DOCUMENTS

| | | | |
|---|---|---|---|
| 3,415,687 | 12/1968 | Methlie | 429/199 |
| 4,163,829 | 8/1979 | Kronenberg | 429/194 |
| 4,167,608 | 9/1979 | Giattino | 429/196 |
| 4,233,378 | 11/1980 | Joo et al. | 429/220 |
| 4,262,065 | 4/1981 | Giattino | 429/196 |
| 4,283,469 | 8/1981 | Goebel et al. | 429/196 |
| 4,352,866 | 10/1982 | Klinedinst et al. | 429/196 |

OTHER PUBLICATIONS

Auborn et al., Research & Development Tech. Report ECOM-0060-1, pp. 1 to 6, Apr. 1972.

Primary Examiner—M. J. Andrews
Attorney, Agent, or Firm—David M. Keay

[57] ABSTRACT

An electrochemical cell having an oxidizable active anode material, a cathode current collector, and an electrolytic solution comprising a reducible liquid cathode material and an electrolyte solute dissolved therein. The cathode current collector includes a mixture of carbon and copper sulfide on a conductive substrate.

12 Claims, 1 Drawing Figure

U.S. Patent    Jan. 22, 1985    4,495,266
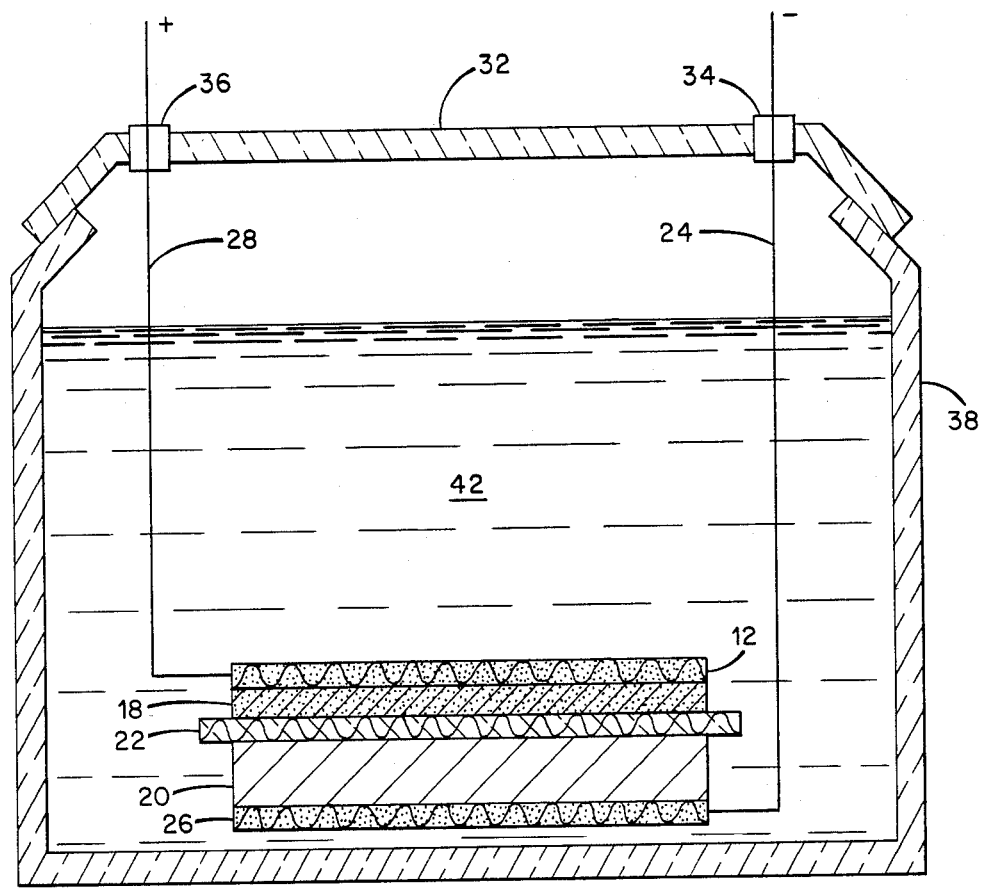

HIGH RATE ELECTROCHEMICAL CELL

BACKGROUND OF THE INVENTION

This invention relates to electrochemical cells. More particularly, it is concerned with primary electrochemical cells having an oxidizable active anode material, a cathode current collector, and an electrolytic solution comprising a reducible liquid cathode material and an electrolyte solute dissolved therein.

A particularly effective class of primary electrochemical cells which employs soluble or liquid cathode materials, as opposed to the more conventional solid cathode cells, has undergone rapid development in recent years. In these cells, the active cathode material is usually a fluid solvent for an electrolyte solute which provides conductivity. The active anode of the cells is usually lithium or other highly electropositive metal. During discharge the solvent is electrochemically reduced on a cathode current collector to yield ions, e.g. halide ions, which react with positive metal ions from the anode to form insoluble metal salts, e.g. metal halides.

A wide variety of materials have been employed to make up cathode current collectors. Improved cathode current collectors and methods of making them are described in U.S. Pat. No. 4,219,443 to Keith A. Klinedinst and Francis G. Murphy and in U.S. Pat. No. 4,272,593 to Keith A. Klinedinst.

SUMMARY OF THE INVENTION

It is an object of the present invention to provide an electrochemical cell with an improved cathode current collector.

It is a more specific object of the present invention to provide an electrochemical cell with an improved cathode current collector which enables high discharge rates and high current densities.

These and other objects are accomplished in electrochemical cells in accordance with the present invention comprising an oxidizable ative anode material, a cathode current collector which comprises a mixture of carbon and copper sulfide adherent to an inert electrically conductive substrate, and an electrolytic solution, in contact with the anode material and cathode current collector, which comprises a reducible liquid cathode material and an electrolyte solute dissolved therein.

The copper sulfide may be either cuprous sulfide ($Cu_2S$) or cupric sulfide (CuS). Improved operating results have been obtained with a ratio of copper sulfide to carbon between three parts copper sulfide to seven parts copper and seven parts copper sulfide to three parts carbon by weight. The preferred range is a ratio between four parts copper sulfide to six parts carbon and six parts copper sulfide to four parts carbon by weight. Best results have been obtained for high discharge rate cells with approximately equal amounts of copper sulfide and carbon by weight.

BRIEF DESCRIPTION OF THE DRAWING

The sole figure of the drawing is a schematic representation in cross-section of a primary electrochemical cell employing a cathode current collector in accordance with the present invention.

For a better understanding of the present invention, together with other and further objects, advantages, and capabilities thereof, reference is made to the following discussion and appended claims in connection with the above-described drawing.

DETAILED DESCRIPTION OF THE INVENTION

The single figure of the drawing is a schematic illustration of an electrochemical cell in accordance with the present invention. The cathode current collector includes an inert, electrically-conductive substrate 12 and a layer of a mixture of carbon black and copper sulfide particles 18. The cathode current collector 12, 18 is preferably separated from the oxidizable anode 20 by a porous separator 22. The anode 20 is electrically connected to a lead wire 24 by a current collector 26. In a similar manner cathode current collector 12, 18 may be electrically connected to a lead wire 28. The lead wires 24 and 28 pass through the cell cover 32 by way of seals 34 and 36, respectively. The cell cover 32 is in close sealing engagement with the main container 38. The interior of the cell container 38 is filled with an electrolytic solution 42 which comprises a fluid, reducible soluble cathode material and an electrolyte solute dissolved therein.

The electrically conductive substrate 12 of the cathode current collector 12, 18 may be any of various materials which are electrically conductive and inert in the presence of the materials employed in the cell. Representative substrate materials are nickel, nickel alloys, and stainless steel. In the particular embodiment under discussion, the substrate is an expanded screen of nickel. The layer 18 of the mixture of carbon and copper sulfide is bonded to the substrate 12 by being pressed into the screen.

The anode 20 is an oxidizable material and is preferably lithium metal. Other oxidizable materials which may be employed in electrochemical cells of this type include other alkali metals and also alkaline earth metals. The electrolytic solution 42 comprises a solvent of a reducible liquid cathode material. Among the cathode materials found useful are fluid oxyhalides, fluid non-metallic oxides, fluid non-metallic halides and mixtures thereof. In the present specific embodiments the solvent is thionyl chloride. An electrolyte solute is dissolved in the solvent in order to raise its conductivity. In the specific embodiments under discussion the solute is lithium tetrachloroaluminate. A thorough discussion of various useful anode materials, cathode solvents, and electrolyte solutes is provided in the above-mentioned patent to Klinedinst and Murphy which is incorporated herein by reference.

The following examples are for the purpose of further illustrating and explaining the present invention, and are not to be taken as limiting the scope thereof. In all of the following examples the cathode current collectors employed a substrate in the form of an expanded nickel screen. The compositions applied to the screens were formed by intimately mixing finely divided copper sulfide and carbon black in a blender. A sufficient amount of a 50% solution of isopropanol in water was blended with the mixture to provide a workable consistency. A binder of a thermoplastic polymer, specifically 10% by weight polytetrafluoroethylene (PTFE) was added to the mixture in the form of an aqueous dispersion. After blending, the mixture was vacuum dried, and the dried material was broken up in a blender. The resulting dry powder composition was pressed onto the nickel screen. In each example more than 75% of the copper sulfide had a particle size less than 45 micrometers. The carbon particles were Shawinigan acetylene black (50% compressed) and the PTFE was DuPont TFE-30.

EXAMPLES I-V

In each of Examples I through V the cathode current collector was 1.0 cm$^2$ by 1.0 mm thick. The anode was of lithium 30 mils thick. The anode and cathode current collector were separated by a glass fiber separator 5 mils thick. The electrolytic solution was 1.8 M lithium tetrachloroaluminate in thionyl chloride. The electrochemical cells were discharged through a constant load of 100 or 200 ohms at a temperature of 25° C. The cell test results shown in Table I are average output voltage ($E_{avg}$), average current density ($I_{avg}$), and discharge capacity (C). Measurements of discharge capacity were taken to a cutoff point of 2.5 V output voltage.

TABLE I

| Example | Composition | Load (ohms) | $E_{avg}$ (V) | $I_{avg}$ (mA/cm$^2$) | C(mAh/cm$^2$) |
|---|---|---|---|---|---|
| I | 90% Carbon Black 10% PTFE | 100 | 3.01 | 30.1 | 21 |
| II | 45% Cu$_2$S 45% Carbon Black 10% PTFE | 100 | 3.26 | 32.6 | 42 |
| III | 45% CuS 45% Carbon Black 10% PTFE | 100 | 3.23 | 32.3 | 46 |
| IV | 90% Carbon Black 10% PTFE | 200 | 3.11 | 15.6 | 34 |
| V | 45% CuS 45% Carbon Black 10% PTFE | 200 | 3.32 | 16.6 | 69 |

As can be seen from Table I, with cells employing a mixture of equal parts by weight of carbon black and copper sulfide the average load voltage is increased by about 200 mV and the discharge capacity is approximately doubled.

EXAMPLES VI-XI

In each of the cells of Examples VI through IX the cathode current collector was 5 cm$^2$ by 0.4 mm thick. Each composition contained 10% PTFE by weight. The copper sulfide was cuprous sulfide (Cu$_2$S). Each anode was lithium metal 30 mils thick. The anode and cathode current collector were separated by a glass fiber separator 5 mils thick. The electrolytic solution was 1.8 M lithium tetrachloroaluminate in thionyl chloride. The cells were operated under conditions of constant current discharge of 200 mA/cm$^2$ at a temperature of 55° C. Test results are shown in Table II.

TABLE II

| Example | Composition Ratio of Cu$_2$S to Carbon | $E_{avg}$(V) | I(mA/cm$^2$) | C(mAh/cm$^2$) |
|---|---|---|---|---|
| VI | All Carbon, no Cu$_2$S | 2.65 | 200 | 5.3 |
| VII | 3 to 7 | 2.68 | 200 | 6.3 |
| VIII | 4 to 6 | 2.77 | 200 | 11.7 |
| IX | 1 to 1 | 2.82 | 200 | 13.3 |
| X | 6 to 4 | 2.82 | 200 | 12.3 |
| XI | 7 to 3 | 2.76 | 200 | 6.0 |

As can be seen from Table II, the load voltage and, more significantly, the discharge capacity are greatly improved at high current densities in cells employing cathode current collectors containing both copper sulfide and carbon black. Optimum results were obtained with approximately equal amounts of copper sulfide and carbon black. The results indicate that an intimate mixture of finely divided copper sulfide and carbon black is particularly advantageous in providing improved discharge capacity in cells operated at very high current density.

While there has been shown and described what are considered preferred embodiments of the present invention, it will be obvious to those skilled in the art that various changes and modifications may be made therein without departing from the invention as defined by the appended claims.

What is claimed is:

1. An eletrochemical cell comprising
   an oxidizable active anode material;
   a cathode current collector as originally fabricated comprising a mixture consisting essentially of carbon, copper sulfide, and a binder adherent to an inert electrically-conductive substrate; and
   an electrolytic solution, in contact with the anode material and cathode current collector, comprising a reducible liquid cathode material and an electrolyte solute dissolved therein.

2. An electrochemical cell in accordance with claim 1 wherein
   the ratio of copper sulfide to carbon in said mixture is between three parts copper sulfide to seven parts carbon and seven parts copper sulfide to three parts carbon by weight.

3. An electrochemical cell in accordance with claim 2 wherein
   the ratio of copper sulfide to carbon in said mixture is between four parts copper sulfide to six parts carbon and six parts copper sulfide to four parts carbon by weight.

4. An electrochemical cell in accordance with claim 3 wherein
   the ratio of copper sulfide to carbon in said mixture is approximately one part copper sulfide to one part carbon by weight.

5. An electrochemical cell in accordance with claim 1 wherein
   the oxidizable anode material is selected from the group consisting of alkali metals and akaline earth metals.

6. An eletrochemical cell in accordance with claim 5 wherein
   the reducible liquid cathode material is selected from the group consisting of fluid oxyhalides, fluid nonmetallic oxides, fluid non-metallic halides, and mixtures thereof.

7. An electrochemical cell in accordance with claim 6 wherein
   said mixture consists essentially of an intimate mixture of carbon black, copper sulfide, and a thermoplastic polymer.

8. An electrochemical cell in accordance with claim 7 wherein
   the ratio of copper sulfide to carbon in said mixture is between three parts copper sulfide to seven parts carbon and seven parts copper sulfide to three parts carbon by weight.

9. An electrochemical cell in accordance with claim 8 wherein the ratio of copper sulfide to carbon in said mixture is between four parts copper sulfide to six parts carbon and six parts copper sulfide to four parts carbon by weight.

10. An electrochemical cell in accordance with claim 9 wherein
the ratio of copper sulfide to carbon in said mixture is approximately one part copper sulfide to one part carbon by weight.

11. An electrochemical cell in accordance with claim 10 wherein
the oxidizable anode material comprises lithium metal; and
the reducible liquid cathode material comprises thionyl chloride.

12. An electrochemical cell in accordance with claim 11 wherein
the thermoplastic polymer is polytetrafluoroethylene.

* * * * *